United States Patent [19]
Koehler et al.

[11] Patent Number: 5,545,323
[45] Date of Patent: Aug. 13, 1996

[54] FILTER ASSEMBLY AND METHOD OF MAKING A FILTER ASSEMBLY

[75] Inventors: Paul C. Koehler; Michael B. Whitlock, both of Cortland, N.Y.; Lawrence J. Noble, Hampshire; George C. Jenkins, West Sussex, both of England

[73] Assignee: Pall Corporation, East Hills, N.Y.

[21] Appl. No.: 373,951

[22] Filed: Jan. 17, 1995

Related U.S. Application Data

[63] Continuation-in-part of Ser. No. 127,556, Sep. 28, 1993, Pat. No. 5,395,039.

[51] Int. Cl.⁶ .................................................. B01D 29/07
[52] U.S. Cl. ........................... 210/493.2; 210/493.5; 210/496; 55/521; 419/2; 419/30
[58] Field of Search ........................ 210/493.2, 496, 210/510.1, 493.5; 55/510, 521; 419/2, 30, 36, 47, 54, 31

[56] References Cited

U.S. PATENT DOCUMENTS

| 2,082,513 | 6/1937 | Roberts. | |
|---|---|---|---|
| 2,957,235 | 10/1960 | Steinberg | 210/493.2 |
| 3,061,917 | 11/1962 | Pall | 419/2 |
| 3,394,445 | 7/1968 | Valyi | 419/2 |
| 3,556,304 | 1/1971 | Collard et al. | 210/489 |
| 4,613,369 | 9/1986 | Koehler | 75/246 |
| 4,740,252 | 4/1988 | Hasegawa et al. | 148/24 |
| 4,822,692 | 4/1989 | Koehler | 428/547 |
| 4,828,930 | 5/1989 | Koehler | 428/547 |
| 4,932,582 | 6/1990 | Une | 228/122 |
| 4,983,423 | 1/1991 | Goldsmith | 427/230 |
| 5,149,360 | 9/1992 | Koehler et al. | 75/228 |

FOREIGN PATENT DOCUMENTS

| 2087773 | 7/1993 | Canada. |
| 0057848 | 9/1982 | European Pat. Off.. |
| 0553637 | 8/1993 | European Pat. Off.. |
| 0561001 | 9/1993 | European Pat. Off.. |
| 63-259063 | 10/1988 | Japan. |
| 2176500 | 12/1986 | United Kingdom. |
| WO9013393 | 11/1990 | WIPO. |

OTHER PUBLICATIONS

"Refractory Metal Powder Filled Braze", Research Disclosure, Dec. 1991, No. 332.

Primary Examiner—Joseph W. Drodge
Attorney, Agent, or Firm—Leydig, Voit & Mayer

[57] ABSTRACT

A filter assembly and a method of making a filter assembly is described wherein a filter pack is seated in an end cap and contacted with a particulate material and a settling liquid of low viscosity to form a filter assemblage. The filter assemblage is sintered to form a strong, virtually impermeable bond therebetween.

69 Claims, 1 Drawing Sheet

FILTER ASSEMBLY AND METHOD OF MAKING A FILTER ASSEMBLY

This application is a continuation-in-part of application Ser. No. 08/127,556, filed Sep. 28, 1993, now U.S. Pat. No. 5,395,039.

FIELD OF THE INVENTION

This invention relates to a filter assembly and a method of making a filter assembly, and, in particular, a method for bonding an end cap to a filter pack.

BACKGROUND OF THE INVENTION

An important procedural aspect of the manufacture of filter assemblies is the process of bonding an end cap to a filter pack. As used herein, the term "filter pack" refers to any structure that includes a filter medium. The filter medium may be, but is not limited to, a metal mesh or a porous metal medium formed from metal powder or metal fibers.

One conventional method of bonding is known as brazing. The end of a filter pack is placed in an end cap with a brazing alloy and the resultant assembly is heated until the brazing alloy melts. The assembly is then cooled and as the molten brazing alloy solidifies, it bonds the end cap to the filter pack.

One disadvantage of this brazing method is that when the brazing alloy melts, the molten brazing alloy may wick up into or along the filter pack for a significant distance away from the end cap. This sometimes starves the joint between the filter pack and the end cap for brazing alloy, resulting in incomplete bonding. In addition, when the molten brazing alloy solidifies, it then blinds the porous filter medium, i.e., closes off the pores of the filter medium to fluid flow. This significantly decreases the effective filtration area of the filter medium and reduces the efficiency of the filter assembly.

Another disadvantage of this brazing method becomes apparent when the brazing method is applied to fine fiber metal media. As the brazing alloy melts, alloying between the fibers and the brazing alloy causes the fibers to melt thus creating a defective seal.

In another conventional method of bonding, the end of a filter pack is compressed to form a dense area. A stainless steel ring and the compressed end of the filter pack are then positioned in an end cap with a brazing alloy. The entire assembly is then welded together to form a filter assembly.

This method gives rise to several disadvantages. Special tooling is required which renders this method undesirably expensive. By compressing the ends of the filter pack, the effective filtration area is reduced, thereby decreasing the efficiency of the filter assembly. Compressing the ends of the filter pack may also cause damage to the filter medium, creating leaks which are difficult to repair. This is a problem especially associated with pleated filter assemblies having wide, open pleats. Further, welding the filter pack to the end cap frequently results in discoloration of the filter assembly.

Another important disadvantage associated with compressing the filter pack prior to welding becomes apparent in the cleaning process. During normal use, the filter assemblies tend to become clogged and require cleaning. Commonly used cleaning agents such as nitric acid may attack the brazing alloy. Thus, the cleaning agent used to clean the filter assemblies must be carefully selected so as not to cause damage to the brazing alloy. In addition, the densified areas of the filter assembly that result from compression have proven to be especially difficult to clean as carbon deposits tend to accumulate in such areas. If these carbon deposits are released during subsequent use, they may contaminate the filtrate.

SUMMARY OF THE INVENTION

In accordance with the present invention, a method of making a filter assembly is provided which substantially overcomes the problems described above. More particularly, the method of this invention provides a means for sinter bonding an end cap to a filter pack. A feature of this invention is that the bonding method provides a strong, virtually impermeable sinter bond between the end cap and the filter pack. The term "virtually impermeable sinter bond", as used herein, refers to a bond having a pore structure that is sufficiently fine so as to prevent bypass around the filter medium.

In accordance with one aspect of this invention, a filter assembly is formed by contacting a filter pack and an end cap with a bonding mixture including a wetting mixture and a particulate material to form a filter assemblage; and heat treating the filter assemblage to sinter the particulate material and fix the end cap to the filter pack.

The bonding mixture used to make the filter assembly in accordance with the invention may be comprised of a wetting mixture and a particulate material. The bonding mixture may include a binder. The wetting mixture acts as a lubricant and allows the individual particles comprising the particulate material to slide past each other and, with mechanical agitation, settle in the cap at the wet tap density. The term "wet tap density" as used herein, refers to the packing density of the particulate material that can be obtained by impacting the particulate material, without mechanical compression, while the particulate material is submerged in fluid.

The filter pack can be brought into contact with the bonding mixture by adding particulate material to the end cap, seating the filter pack in the end cap and adding wetting mixture to the end cap. The end cap and the filter pack may be agitated to distribute the particulate material within the filter pack.

The heat treating step causes the individual particles of the particulate material to sinter bond with each other and with the filter pack and the end cap. Generally, the end cap and the filter pack comprise materials having a sintering temperature equal to or greater than the sintering temperature of the particulate material. Therefore, during heat treatment the particulate material may sinter bond to the end cap and the filter pack without degrading the structure of the end cap and the filter pack.

The present invention also provides a filter assembly comprising an end cap, a filter pack and a sinter bond fixing the end cap to the filter pack. The sinter bond includes a particulate material having individual particles that are sinter bonded to each other and to the filter pack and the end cap.

In accordance with this aspect of the invention, the sinter bond formed between the end cap and the filter pack is exceptionally strong and virtually impermeable. The strength of the bond and its virtual impermeability may be attributable to diffusion which takes place between individual particles of the particulate material, the end cap and the filter pack during sintering.

DETAILED DESCRIPTION OF THE EMBODIMENTS

Figure 1:
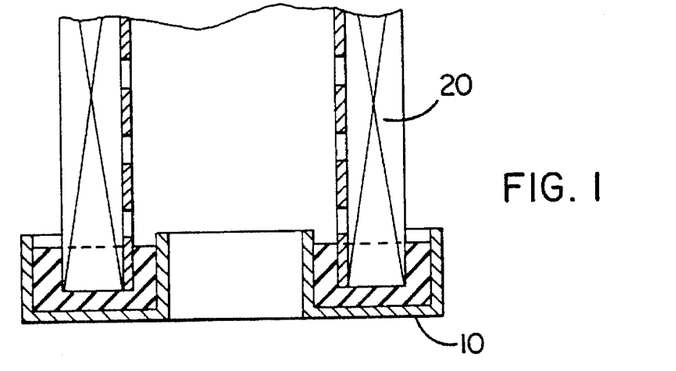
FIG. 1 is a cross-sectional view of a filter pack including an end cap.

The subject invention is directed to a filter assembly and method of making a filter assembly by fixing an end cap to a filter pack. According to an aspect of the invention as shown in FIG. 1, a filter pack 20 is provided including a filter medium and support and drainage layers. The filter pack 20 may comprise a pleated composite. The filter pack 20 may be designed for outside-in flow or inside-out flow. Preferably, the filter medium may be a sheet of compressed metal fibers having a nominal fiber diameter of about 2 µm. Preferred metals include 316L, 304 and 304L stainless steel. A support and drainage layer may be positioned on the downstream side of the filter medium, if desired. In addition, a support layer may be positioned on the upstream side of the filter medium. The support and drainage layers are preferably metal mesh layers constructed from 42×42 square weave wire mesh having a wire diameter of about 0.005". The support and drainage layer may also be constructed from 40×40 square weave wire mesh having a wire diameter of about 0.010".

The filter pack 20 may be configured in a variety of ways. For example, the filter pack 20 may be linear, conical, or cylindrical. A cylindrical filter pack is particularly preferred.

The end cap 10 may be any conventional end cap. Generally the end cap 10 defines a trough. Alternatively, the end cap 10 may define a substantially flat surface. In addition, the end cap may have a porous construction; e.g., the end cap may comprise a powder metal. To enhance the quality of the sinter bonds between the end cap 10 and the particulate material, the surface of the end cap 10 may be treated by, for example, sand blasting or acid etching.

In accordance with the method aspects of the invention, the filter pack and the end cap are contacted with a bonding mixture to form a filter assemblage, where the filter assemblage refers to the filter assembly at an intermediate stage of formation. The filter assemblage is then heat treated to sinter bond the constituents of the bonding mixture to each other, the filter pack and the end cap.

The filter pack and the end cap may be contacted with the bonding mixture in a variety of ways. A preferred manner of contacting the filter pack and the bonding mixture may be described as follows. The particulate material may be placed in the end cap and wet with a wetting mixture. Then the filter pack may be seated in the end cap, where seating generally refers to firmly locating the filter pack next to the end cap such as by placing the filter pack in direct or indirect contact with the inside surface of the end cap. Additional wetting mixture may be introduced into the end cap and the filter assemblage may be agitated.

Alternatively, to contact the filter pack and the end cap with the bonding mixture, the filter pack may be seated in the end cap either before or after adding the bonding mixture to the filter pack. Subsequently, the filter assemblage may be agitated.

The term "bonding mixture" is a general term used to refer to a composition having several constituents. The bonding mixture may include a particulate material or a particulate material and a wetting mixture. The "wetting mixture" may include a settling liquid, a settling liquid and a binder or a settling liquid and a binder mixture. The term "settling liquid" as used herein is defined as a liquid that does not suspend the individual particles of the particulate material and allows the individual particles to freely settle. The binding mixture preferably includes a binder dispersed in a carrier liquid.

After the filter pack and the end cap are contacted with the bonding mixture, the filter assemblage is heat treated to sinter the particulate material, thus forming the filter assembly and creating a strong, virtually impermeable sinter bond between the filter pack and the end cap.

The end cap may be formed from any sinterable material. Preferably, the end cap comprises a metal or a metal alloy including but not limited to, nickel, stainless steel or nickel base alloys. However, other suitable materials such as ceramics can be used. If a ceramic end cap is used, it is preferable to preapply a metal layer in any suitable manner such as flame spraying. However, most preferably, the end cap is composed of 316L, 304L or 304 stainless steel to avoid the necessity of pretreating the end cap. Further, the end cap can be variously configured. For example, it may be a blind end cap or an open end cap, it may be flat, it may define a trough which receives the filter pack, and/or it may be irregularly shaped. The trough may be dovetailed to provide axial wedging of the filter pack.

The filter pack includes a filter medium and may also include one or more support and/or drainage layers. A preferred filter medium is a porous metal medium formed, for example, from metal powder or metal fiber. Metal mesh media are also effective. While metal is a preferred material for the filter medium, the filter medium may alternatively be formed from any suitable sinterable material. In addition, the filter medium may be formed from any of the materials suitable for the end cap. The pore rating of the filter pack may vary over a wide range, e.g., from about 0.02 µm to about 200 µm. Further, the filter medium can be variously configured. For example, it may be pleated or non-pleated and it may be cylindrically, conically or disk shaped.

The support and drainage layers preferably comprise wire mesh. More preferably, the support and drainage layers may be metal mesh layers including 316L stainless steel wire mesh such as 42×42 square weave wire mesh having a wire diameter of about 0.0055" or 40 ×40 square weave wire mesh having a wire diameter of about 0.010".

In accordance with the invention, the bonding mixture includes a particulate material and a wetting mixture. Preferably, the particulate material may comprise a powder or a fiber. More preferably, the particulate material comprises a powder. The particulate material may have various cross-sectional shapes including dendritic, acicular, fibril, oval, rectangular, elliptical, spherical or any other regular or irregular shape. The particulate material further comprises a sinterable material such as a sinterable metal or metal alloy or a combination of metals and metal alloys. Suitable materials include, but are not limited to, gas atomized nickel based alloys, nickel-copper alloys, nickel-chromium based alloys, austenitic stainless steel or any other alloy compatible with the filter medium. 316L water atomized stainless steel is most preferred. However, the most suitable type of metal or metal alloy should be selected in accordance with the environment in which the particulate material will be used.

Alternatively, the particulate material may comprise a mixture of two or more components having different sintering properties, i.e., sintering temperatures. The lower sintering temperature component(s) preferably include(s) materials that will sinter bond at temperatures at or below 1900° F. Suitable materials include alloys such as nickel-copper alloys, nickel-chrome alloys, gas atomized nickel based alloys, silver based alloys, silver-copper based alloys, or any other material that has a lower sintering temperature than the high sintering temperature component. Nickel-chromium alloys are particularly preferred.

The higher sintering temperature component(s) preferably comprise(s) materials that sinter bond at temperatures at or above the lower sintering temperature component(s). For example, the higher sintering temperature component(s) may comprise a metal or a metal alloy, including but not limited to nickel, iron, titanium, chromium, molybdenum and tungsten or any alloy of these metals. Austenitic stainless steel, chromium-nickel and copper-nickel alloys are particularly preferred. 316L and 304L water atomized stainless steel are especially preferred.

Preferably, the nominal particle size for the particulate material may be chosen based on such factors as the porosity of the filter medium, the pore size of the filter medium, and the sintering temperature of the alloy or the alloys that comprise the particulate material. Preferably, the particulate material has a nominal particle size of between about 0.5 μm and about 70 μm, where nominal particle size may be determined, for example, with reference to the size of an opening in a standard mesh or by microscopic optical analysis. More preferably, the nominal particle size is between about 1 μm and about 50 μm. Powders having a nominal particle size of about 10 μm and less are particularly preferred.

The wetting mixture may comprise a settling liquid and a binder, a settling liquid and a binder mixture or a settling liquid alone. Preferably, the wetting mixture has a viscosity of 1000 cp or lower, more preferably, 100 cp or lower and even more preferably 50 cp or lower. A wetting mixture with a viscosity of 2 cp or lower is most preferred, to prevent suspension of the particulate material. Suitable liquids include, but are not limited to, acetone, alcohol such as ethanol, isopropyl alcohol and Freon™. Isopropyl alcohol is especially preferred.

A preferred binder for the wetting mixture is a polyacrylic acid such as that available from B.F. Goodrich Chemicals Company under the trade name Carbopol. Carbopol 934 and Carbopol 941 are particularly preferred. Carbopol 941 has a molecular weight of about 1,250,000 and Carbopol 934 has a molecular weight of about 3,000,000. Other Carbopol family polymers are also suitable binders. Additional suitable binders are methycellulose and sodium alginate.

It is desirable to include a binder mixture, i.e., a binder and a carrier, in the wetting mixture when the settling liquid does not readily disperse the binder. Water is a preferred carrier for Carbopol binders.

Referring to FIG. 1, in a first embodiment of a method according to the invention, particulate material is added to the end cap 10 in a sufficient quantity such that the depth of powder in the end cap 10 is between about ⅛" to about ½", preferably about ⅜", after seating the filter pack. The amount of particulate material added to the end cap 10 may be adjusted according to the spacing of the pleats in the filter pack. A preferred particulate material is 316L water atomized stainless steel powder having a nominal particle size of about 10 μm and less available from the Specialty Division of Ametek Corporation.

After the particulate material has been added to the end cap 10, a wetting mixture may be added to the end cap 10 to wet the particulate material, if desired. However, at this time it is not desirable to fluidize the particulate material. By wet, it is meant that a sufficient amount of wetting mixture is added to the end cap to cause the particulate material to begin to cake like damp sand. Wetting the particulate material is advantageous as it helps to retain loose particles of particulate material in the end cap, but it is not a necessary step in forming the filter assembly.

Once the particulate material has been wet, the filter pack 20 may be seated in the end cap 10. Seating can be realized by rotating the filter pack 20 clockwise, counter clockwise or alternately clockwise and counter clockwise within the end cap 10, while vibrating or tapping the end cap 10 on a hard surface. This rotation helps displace the particulate material so that the ends of filter pack 20 are positioned as close as possible to the inside surface of the end cap 10. It also works the particulate material into the pleats of the filter pack 20. Preferably, at this time, the end cap 10 contains a layer of particulate material between about ⅛" to about ½" deep. More preferably, the end cap 10 contains a layer of particulate material between about ¼" to about ⅜" deep. In this state, the filter pack 20 and the end cap 10 will be referred to collectively as the filter assemblage.

In accordance with an aspect of the invention, the end cap 10 is then filled with sufficient amount of wetting mixture to thoroughly wet and submerge the particulate material so that the particulate material may be fluidized. When the particulate material settles, it is desirable for the bonding mixture to comprise an upper layer of wetting mixture and a lower layer of particulate material. A suitable wetting mixture may be selected on the basis of the wetting angle of the wetting mixture/particulate interface. The term "wetting angle" is a measure of the affinity of a liquid for a solid surface. The wetting angle is greater than 90° for nonwetting liquids and less than 90° for wetting liquids. An advantage of selecting a wetting mixture with a wetting angle less than 90° is that it enhances contact between the particulate material and the filter medium as the bonding mixture is drawn into the filter medium through capillary action.

Preferably, the wetting mixture has a viscosity low enough to prevent suspension of the particulate material and to allow some of the particulate material to disperse into the filter pack 20 and easily settle. However, the appropriate viscosity depends upon the grade of the particulate material and the pore size of the filter medium. For example, for particulate material with a nominal particle size of about 40 μm and for filter media having a pore size of about 70 μm, a liquid having a viscosity of up to 800 cp is suitable. For particulate material having a nominal particle size of about 10 μm and for filter media having a pore size of about between 2 μm and 10 μm, a liquid having a viscosity of 50 cp or lower is preferable.

The component of the wetting mixture that thoroughly wets the particulate material, promotes dispersal of the particulate material throughout the filter pack and enhances the ability of the particulate material to easily settle is the settling liquid. Examples of preferred settling liquids include, but are not limited to, acetone, alcohol such as ethanol and isopropyl alcohol, and Freon™. Isopropyl alcohol is especially preferred.

To reduce the risk of disturbing the bonds and to improve green strength, a binder may be included in the wetting mixture. It is preferable that the wetting mixture maintain a sufficiently low viscosity to ensure settling of the particulate material and thorough dispersal during wicking. Therefore, if a binder is to be added to the wetting mixture, preferably, it should be added in an amount which allows the viscosity of the wetting mixture to remain below about 50 cp. For example, for a wetting solution comprising isopropyl alcohol as the settling liquid and Carbopol 934 as the binder, the ratio of settling liquid to binder preferably ranges between about 1:0.0002 to about 1:0.02, more preferably from about 1:0.0007 to about 1:0.005 by weight. Isopropyl alcohol is a particularly preferred settling liquid as it disperses Carbopol 934 without aid of a carrier. However, if a settling liquid is used in the wetting mixture that does not disperse binders, than a binder mixture may be added to the settling liquid. The binder mixture may be formed by mixing a binder with a carrier liquid.

Some of the particulate material may be drawn into the surface of the filter pack 20 as well as between the pleats and interstices of the filter pack 20 through a process known as wicking. The term "wicking" as used herein, means that the filter medium and the support and drainage layers of the filter pack 20 draw bonding mixture from the end cap 10 through capillary action. Through this process, the particulate material may be distributed on the surface of the filter medium and within the mesh of the support and drainage layers. The particulate material may also be distributed within the pleats and interstices of the filter medium. A sufficient amount of particulate material may wicks into the filter pack 20 to promote significant contact between the particulate material and the filter pack 20 and facilitate the formation of a strong and effective bond along the ends of the filter pack 20 and along the surface of the filter medium adjacent the ends of the filter pack 20, upon sintering.

To fluidize the particulate material, the filter assemblage is agitated, i.e., impacted and/or vibrated and/or subjected to centrifugal force. Preferably, the particulate material remains submerged during agitation. By vibrate, it is meant that the filter assemblage is rapidly moved back and forth. By impact, it is meant that the filter assemblage is tapped or dropped against a hard surface. As a result of impacting, particulate material settles at the bottom of the trough of the end cap 10 at a given density, e.g., the wet tap density, so that the bonding mixture includes an upper layer of settling liquid and a lower layer of particulate material. Through a combination of agitation and wicking, the bonding mixture contacts the surface of the filter pack 20. Preferably, the bonding mixture insinuates into the filter pack 20 such that the ends of the pleats are covered with the bonding mixture and the bonding mixture penetrates into the filter pack 20.

The filter assemblage may be vibrated using any suitable mechanism for subjecting the filter assemblage to vibration. Preferably, the filter assemblage may be placed onto a driver such as a pneumatic vibrating table and vibrated for a time period of between about 30 seconds and about 15 minutes. In addition, the filter assemblage may be impacted by any known method. Preferably, the filter assemblage may be impacted by tapping the filter assemblage against a solid surface for between about 5 seconds and about 15 minutes. Alternatively, the filter assemblage may be impacted by placing the assemblage in a "lift-drop" mechanism that lifts the assemblage to a given height, i.e., the free fall height, and drops the assemblage against a hard surface. Preferably the filter assemblage is raised to a free fall height of between about ⅛" and about 1" and dropped repeatedly against a hard surface for between about 5 seconds and about 15 minutes. Also, impacting may be realized by maintaining the filter assemblage stationary and dropping an object onto the filter assemblage or striking an object against the filter assemblage. The filter assemblage may be subjected to centrifugal force by rotating the filter assemblage about its center of gravity.

Subsequent to agitation, at least a part, and preferably the majority of the settling liquid is removed from the bonding mixture prior to heating treating the filter assemblage. The settling liquid is preferably removed by drying. However, the settling liquid may be removed by vacuuming or any other suitable removal process. The drying time and temperature are determined according to the type of settling liquid and the type of particulate material employed in the bonding mixture. For example, for 316L stainless steel powder having a nominal particle size of about 10 μm and less and a typical 2 μm diameter fibrous porous metal medium, it is preferred that drying take place for about 1 hour at about 180° F. It is preferable not to disturb the filter assemblage immediately after drying because the bonds between the particulate material, the end cap 10 and the filter pack 20 are relatively weak at this time.

Finally, to complete the bonding process the filter assemblage is heat treated to sinter bond the individual particles of the particulate material to each other, the end cap 10 and the filter pack 20. Heat treatment is preferably carried out at a temperature high enough to promote solid state diffusion of metal atoms from one particle to another to form sintered bonds. Appropriate sintering times and temperatures are selected according to such factors as the type and size of the material of the filter pack and the type and size of the particulate material. For stainless steel metal powder, a temperature in the range of from about 1,600° F. to about 2,450° F., more preferably from about 1,800° F. to about 2,375° F. for a period of time from about 15 minutes to about 2 hours has been found adequate. For 316L stainless steel powder having a nominal particle size of about 10 μm, sintering at a temperature of about 1,900° F. for about 20 minutes is preferred. When using particulate material that includes, either exclusively or in a blend, metal alloy powders of a melting point lower than that of the end cap, the end cap may be "pretinned" to improve bonding during heat treatment. Pretinning may be realized by melting a small amount of the lower melting point alloy in the end cap 10 to create a thin layer of low melting point alloy. Accordingly, pre-tinning of the end cap will ensure that the particulate material will sinter bond to the end cap as opposed to melting before sintering can take place.

Figure 2:
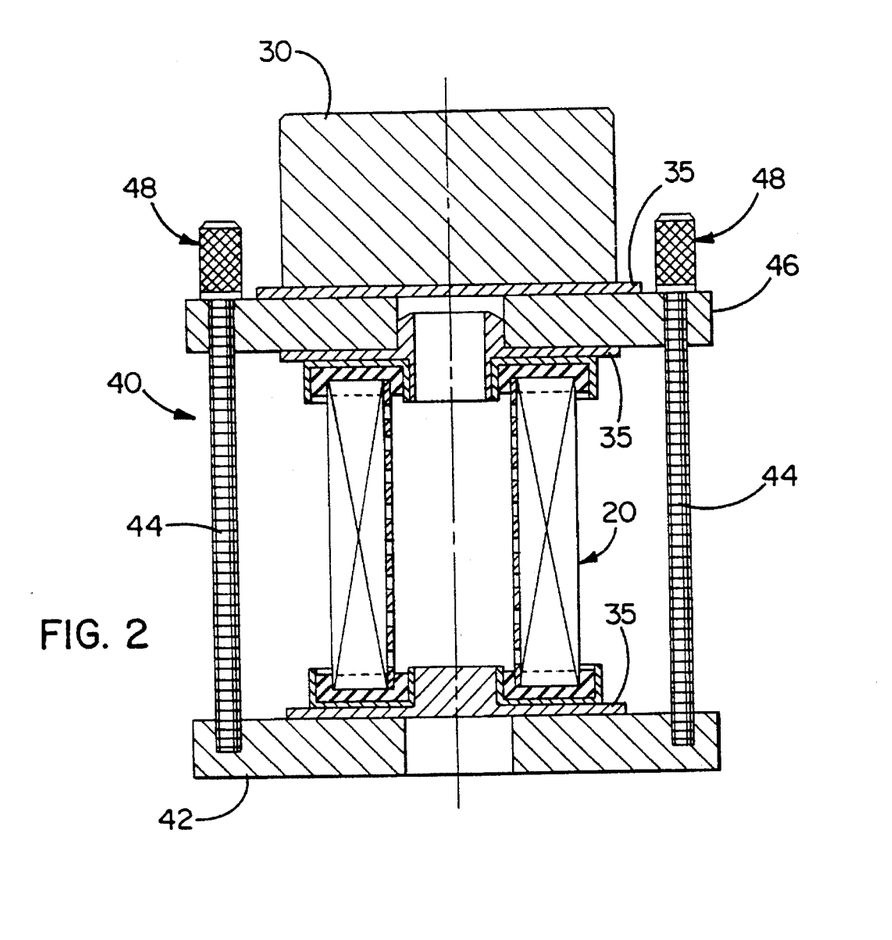
FIG. 2 is a cross-sectional view of a filter assembly embodying the invention and including a filter pack disposed between end caps.

Sintering is preferably effected by heat treating the filter assemblage in a hydrogen retort type furnace. For ease of handling of the filter assemblage and to promote contact between the particulate material, the filter pack and the end cap, it is advantageous to press the filter pack 20 against the end cap 10 before heat treatment. The filter pack 20 may be pressed against the end cap 10 by placing the filter assemblage in a fixture 40, as depicted in FIG. 2. The assemblage is preferably placed in the fixture before agitation, in which case the agitation process is performed on the fixture with the filter assemblage disposed therein. However, the filter assemblage may be placed in the fixture at any time prior to heat treatment. An exemplary fixture 40 is depicted in FIG. 2. The fixture 40 includes a base 42 connected to a pair of support rods 44. The support rods 44 may include threaded ends. An upper support member 46 may be slidably engaged with the support rods 44. Nuts 48 may be attached to the support rods at the threaded ends. The filter assemblage is carefully placed in the fixture 40 so that an end of the filter pack 20 is adjacent the base 42. The upper support member 46 is then tightened over the other end of the filter assemblage to provide stability. To prevent the filter assemblage from bonding with the fixture during sintering, a protective cover 35 is placed between the first end of the filter assemblage and the base 42 and a protective cover 35 is placed between the second end of the filter assemblage 20 and the upper support member 46. Preferably, before the filter assemblage is heat treated, a protective cover 35 is placed on the upper support member of the fixture 40. A weight 30 is then deposited on the protective cover 35. The weight 30 helps maintain constant pressure on the filter assemblage during sintering and helps to enhance contact between the bottom surface of the filter pack 20 and the particulate material. An advantage of the protective cover 35 is that it prevents bonding between the weight and the filter assemblage during heat treatment.

Alternatively, the filter pack 20 may be pressed against the end cap 10 by applying a weight 30 to the filter pack 20. The weight 30 may be a stainless steel block preferably weighing between 2000 and 2500 g. A protective cover 35 may be placed over the top surface of the filter pack 20 which is seated in the end cap 10 and the weight 30 may be disposed thereon prior to sintering. This helps strengthen the bond between the end cap 10 and the filter pack 20 by enhancing contact between the bottom surface of the filter pack 20 and the particulate material. Preferably, the protective cover 35 may be a metal or ceramic sheet. More preferably, the protective cover 35 may be an alloy selected from the Inconel™ alloys. Inconel™ X750 is particularly preferred. An advantage of the protective cover 35 is that it prevents bonding between the weight and the filter assemblage during sintering.

After fixing the first end cap to one end of the filter pack, the opposite end cap may be fixed to the opposite end of the filter pack by repeating the above steps. Alternatively, both ends of the filter pack may be fit with end caps before heat treatment. Thus, both end caps may be bonded to the filter pack in a single heat treatment step.

As a result of the above described method, a filter assembly is produced having a strong sinter bond and an effective seal between the filter pack and the end caps. Unlike the bonds formed by melting brazing alloys, the bond created according to the invention defines a structure including a multitude of individual particles where adjacent particles share a common boundary along a portion of their surfaces but include discrete boundaries that may be free from contact along other portions of their surfaces. The bond is similar in strength to the bond formed by epoxy end-capping but it can withstand higher temperatures and greater temperature variations than an epoxy bond. However, the method according to this invention can be used to bond materials that do not take to epoxy bonding.

According to a second embodiment of the invention, the metal particulate may comprise a mixture of two or more components having different sintering properties, i.e., sintering temperatures. Preferably, the particulate material comprises a lower sintering temperature component and a higher sintering temperature component. The low sintering temperature component preferably includes materials that will sinter bond at temperatures at or below 1,900° F. Suitable materials include alloys such as nickel-copper, e.g., 66% of nickel and 32% of copper alloys, gas atomized nickel based alloys, silver based alloys, nickel-chromium alloys, silver-copper based alloys, or any other material that has a lower sintering temperature than the high sintering temperature component. Nickel-chromium alloys of between about 90% to about 77% chromium and about 25% to about 7% nickel by weight are preferred. A nickel-chromium alloy of about 15% chromium and about 85% nickel by weight is particularly preferred.

The high sintering temperature component preferably comprises materials that sinter bond at temperatures above the sintering temperature of the low sintering temperature component. For example, the high sintering temperature component may comprise a metal or a metal alloy, including but not limited to: nickel, iron, titanium, chromium, molybdenum and tungsten or any alloy of these metals. Austenitic stainless steel and chromium-nickel alloys, e.g., 17% chromium and 12% nickel are particularly preferred. 316L and 304L water atomized stainless steels are especially preferred. The high sintering temperature component and the low sintering temperature component each have a nominal particle size about the same as that of the metal particulate described in the first embodiment.

The low sintering temperature component and the high sintering temperature component are blended to form the particulate material. The weight ratio of low sintering temperature component to high sintering temperature component is in the range of from about 1:6 to about 3:1. Preferably, the weight ratio of the low sintering temperature component to the high sintering temperature component is about 1:3. After the particulate is prepared, a procedure similar to that described in the first embodiment is conducted. In the heat treatment step, it is desirable to heat treat the filter assemblage such that the low sintering temperature component forms sinter bonds with the high sintering temperature component, the filter pack and the end cap, but does not melt. Preferably, the assemblage may be heat treated for between about 15 minutes and about two hours at a temperature of between about 500° F. and about 1,950° F., more preferably for between about 18 minutes and about 30 minutes at a temperature of between about 1,850° F. and about 1,900° F. When heat treated, particulate material comprising a blend of high/low sintering temperature powders often sinter bonds at a lower temperature than particulate material comprising a homogenous high sintering temperature powder due to localized alloying between adjacent particles of low sintering temperature powder and high sintering temperature powder. Accordingly, by using a blended particulate material, over-sintering of the filter medium may be avoided.

It is desirable to avoid excessive heat treatment of the filter assemblage because the alloying that takes place between the different components may adversely affect the structure of the filter medium. When the high sintering temperature component is of similar composition to the filter medium and the end cap, it is further desirable to heat treat the assemblage so as to achieve sintering between the low sintering temperature component and the high sintering temperature component without causing excessive sintering of the filter medium. This will create a strong bond between the filter pack and the end cap without degrading the filter medium.

The method of this embodiment produces a sinter bond that defines a structure having a multitude of adjacent individual particles of the low sintering temperature component of the particulate material where the adjacent particles share a common boundary space along a portion of their surfaces, but also include discrete boundary spaces that may be free from contact along other portions of their surfaces. In addition, this bond may include a multitude of adjacent individual particles of the high sintering temperature component of the particulate material where the adjacent particles may be in point contact or may share a common boundary space along a portion of their surfaces but may also include discrete boundary spaces that are free from contact along other portions of their surfaces. Individual particles of the low sintering temperature component of the particulate material are at least in point contact with adjacent particles of the high sintering temperature component of the particulate material and the majority of the individual particles are in full surface-to-surface contact. That is, most of the individual particles of the low sintering temperature component of the particulate material are fully sinter bonded to adjacent particles of the high sintering temperature component of the particulate material and to the filter pack and the end cap.

The above described methods of making a filter assembly are effective when used in conjunction with filter packs including pleated filter media comprising porous metal structures, metal mesh, cylindrical wraps and the like. These methods are particularly advantageous when used in connection with filter packs having pleated filter media with large, widely spaced pleats which, for example, are greater than ⅜ inches in height. Filter packs having pleats at least as high as 3 inches and greater may be effectively bonded with end caps according to the method described herein. Other known assembly methods such as coining and welding are not preferred as they are likely to cause damage to the filter media.

The invention encompasses several variations of the methods hereinbefore described. For example, instead of seating the filter pack 20 in the end cap 10 which contains the particulate material, the filter pack 20 may be seated in the end cap 10 prior to addition of the particulate material. Settling liquid and the particulate material can then be added to the end cap 10 in any order and the end cap 10 and the filter pack 20 may be heat treated as previously described.

In yet another variation, the bonding mixture comprising the particulate material and the wetting mixture can be prepared in advance of the time it is added to the end cap 10 by combining wetting mixture with particulate material in a ratio of about 2:1 to about 1:1. Preferably, the ratio of wetting mixture to particulate material in the bonding mixture is 1.5:1.0. After the bonding mixture is prepared, it may be added to the end cap 10 either before or after the filter pack 20 has been seated in the end cap 10. The end cap 10 and the filter pack 20 are subsequently agitated thus dispersing the particulate material and allowing the particulate material to tightly settle against the filter medium, thus forming a filter assemblage. The filter assemblage may be heat treated as previously described.

In still another variation, the filter assembly may be made using a dry process. That is, the bonding mixture may be comprised of particulate material only. The bonding mixture may be added to the end cap 10 either before or after the filter pack 20 has been seated in the end cap 10. The end cap 10 and the filter pack 20 are then placed in the fixture and agitated. The filter assemblage may then be heat treated as previously described.

A primary advantage of the invention is that a filter assembly is produced that has a strong, effective bond between the filter pack and the end cap. The bond has the ability to withstand high temperatures substantially equal to the filter medium's ability to withstand high temperatures. Another advantage of the invention is that the disclosed methods may be used to bond filter packs having varied pleat heights and spacings. Unlike many known bonding methods, there is no need to densify the ends of the filter pack to facilitate bonding. Moreover, the method according to this invention does not adversely affect the integrity of the filter medium. That is, the particulate material sinter bonds to the filter medium without degrading the structure of the medium.

A pair of ends cap were bonded to a filter pack to form a filter assembly by the methods set forth in the following examples. These examples are presented by way of illustration and not by way of limitation.

EXAMPLE 1

A 316L stainless steel powder having a nominal particle size of about 10 μm was added to the trough of a first 316L stainless steel end cap. The trough was generally annular and had a depth of about 0.25" and inner and outer diameters of about 1.86" and about 0.25" respectively. A first end of a filter pack was seated in the trough by repeatedly rotating the filter pack alternately clockwise and counter clockwise and tapping the end cap on a hard surface. Three or four repetitions were sufficient to seat the filter pack in the trough of the end cap. After the filter pack was seated, the end cap contained about 0.19" of powder. The filter pack included a porous metal HEPA filter medium formed from 316L stainless steel and available from Pall Corporation under the trade designation Ultra Met-L HEPA; a support and drainage layer of 42×42 square weave wire mesh of 0.0055 inch diameter 316L stainless steel wire positioned on the upstream side of the filter medium; and a support and drainage layer of 40×40 square weave wire mesh of 0.010 inch diameter 316L stainless steel wire positioned on the downstream side of the filter medium. The support and drainage layers and the filter medium were corrugated and formed in a hollow, generally cylindrical configuration, the intended flow being outside-in through the filter pack. The inner and outer diameters of the filter pack were 1.0" and 2.5" respectively and the filter pack had a length of about 10".

The filter assemblage, i.e., the filter pack seated in the end cap, was then placed in a fixture. The fixture included a base, a lower support member and an upper support member connected to a pair of support rods and nuts, as shown in FIG. 2. A protective cover in the form of an Inconel™ X750 separator mesh was then placed on the base, and the end cap containing the metal powder and the seated filter pack was placed on the protective cover. A second protective cover, again in the form of an Inconel™ X750 separator mesh, was placed on the opposing end of the filter pack. The upper support member was placed on the second protective cover with the support rods extending through holes in the support member. The nuts were then tightened onto the rods, clamping the fixture and filter assemblage together.

The trough of the end cap was then filled with a wetting mixture containing isopropyl alcohol and undiluted Carbopol 934 in a ratio of about 1:002 by weight. The fixture including the filter assemblage was then placed on a pneumatic vibrating table and vibrated for approximately 1 minute at a frequency and amplitude of about 10–30 Hz and 0.010" respectively. A sufficient amount of wetting mixture was added to the end cap intermittently during vibration to maintain the fluid level above the particulate material and to keep the particulate material fluidized. The fixture including the filter assemblage was then repeatedly impacted by lifting and dropping the fixture on a hard surface from a free-fall height of approximately ½". Impacting was performed for about 15 seconds, e.g., about 20 repetitions. After vibration/impact, fluid was dried from the end cap by placing the fixture in a convection oven at 180° F. for about 24 hours.

After drying, the fixture was removed from the oven. A third protective cover in the form of an Inconel™ X750 separator mesh was placed on the upper surface of the upper support of the fixture and the fixture was then placed in a hydrogen bell furnace. A 2000 g stainless steel weight was deposited on the third protective cover and the filter assemblage was sintered for about 20 minutes at 1900° F. to sinter bond the individual particles of the metal particulate with each other, the filter pack and the end cap. The presence of the protective covers prevented the weight and the filter assemblage from bonding to the fixture.

After sintering, the fixture was removed from the hydrogen bell furnace and cooled, and the filter assemblage was then removed from the fixture. A second 316L stainless steel end cap was then bonded to the second end of the filter pack by repeating the above described procedure.

As a result of the process described in this example, a strong, virtually impermeable sinter bond was formed between the ends of the filter pack and the first and second end caps. Structurally, each bond defines a particulate mass including a multitude of adjacent individual particles of stainless steel. The adjacent particles typically share a common boundary along at least a portion of their surfaces where they are sinter bonded to each other but may also include discrete boundaries that are free from contact along other portions of their surfaces. The resultant bond is sufficiently impervious as to prevent bypass flow around the filter medium.

EXAMPLE 2

A particulate material was formed by mixing 316L stainless steel powder having a nominal particle size of about 10 μm with a nickel-chromium alloy powder (about 15% chromium and about 85% nickel by weight) having a nominal particle size of about −400 standard sieve. The nickel-chromium alloy powder was combined with the stainless steel powder in a ratio of about 1:3 by weight and blended manually with a paddle until a uniform mixture was obtained.

The powder was added to the annular trough of a first end cap as described in Example 1, and the first end of a filter pack was seated in the trough of the end cap in the same way that the first end of the filter pack was seated in the first end cap in Example 1. The first end cap of this example was identical to the first end cap of Example 1. The filter pack of this example was also identical to the filter pack of Example 1 except that the downstream support and drainage layer was a 42×42 square weave wire mesh of 0.0055" diameter 316L stainless steel wire.

The filter assemblage, i.e., the filter pack seated in the end cap, was then placed in a fixture. The fixture and the method of clamping the filter assemblage in the fixture were identical to those of Example 1 as were the protective covers.

The trough of the end cap was then filled with a wetting mixture containing-only isopropyl alcohol. The fixture including the filter assemblage, was then vibrated, impacted and dried in the same manner as described in Example 1. A sufficient amount of wetting mixture was added to the end cap intermittently during vibration to maintain the fluid level above the particulate material and to keep the particulate material fluidized.

After drying, the fixture was removed from the oven. A third protective cover in the form of an Inconel™ X750 separator mesh was fit on the upper support of the fixture, and the fixture was placed in a hydrogen bell furnace. A 2000 g stainless steel weight was deposited on the upper protective cover and the filter assemblage was sintered for about 20 minutes at 1900° F. to sinter bond the individual particles of the metal particulate with each other, the filter pack and the end cap. The presence of the protective covers prevented the weight and the filter assemblage from bonding to the fixture.

After sintering, the fixture was removed from the hydrogen bell furnace and cooled, and the filter assemblage was then removed from the fixture. The trough of a second 316L stainless steel end cap was then filled with the particulate mixture previously described and the second end of the filter pack was bonded to the end cap by repeating the above described procedure.

As a result of the process described in this example, a strong, virtually impermeable sinter bond was formed between the filter pack and the end cap. Structurally, the bond defines a particulate mass including a multitude of adjacent individual particles of the stainless steel and the nickel-chromium alloy described above. The adjacent particles of stainless steel and nickel-chromium alloy typically share a common boundary along at least a portion of their surfaces where they are sinter bonded to each other but may also include discrete boundaries that are free from contact along other portions of their surfaces. The resultant bond formed between the end cap and the filter pack is sufficiently impervious as to prevent bypass flow around the filter medium.

EXAMPLE 3

A particulate material consisting of an alloy of about 15% chromium and about 85% nickel by weight and having a nominal particle size of about −400 standard sieve was added to the annular trough of a first 316L stainless steel end cap. The first end of a filter pack was seated in the trough of the first end cap in the same way that the first end of the filter pack was seated in the first end cap in Example 1. After the filter pack was seated, the end cap contained about ¼" of alloy powder. The end cap and the filter pack were identical to those of Example 2.

The filter assemblage, i.e., the filter pack seated in the end cap, was then placed in a fixture. The fixture, including the protective covers, and the method of clamping the filter assemblage in the fixture were identical to those of Example 1.

The trough of the end cap was then filled with a wetting mixture containing only isopropyl alcohol. The fixture, including the filter assemblage, was then vibrated, impacted and dried in the same manner as described in Example 1. A sufficient amount of wetting mixture was added intermittently to the end cap during vibration to maintain the fluid level above the particulate material and to keep the particulate material fluidized.

After drying, the fixture was removed from the oven. A third protective cover in the form of an Inconel™ X750 separator mesh was fit on the upper support of the fixture, and the fixture was placed in a Hydrogen Bell furnace. A 2000 g stainless weight was deposited on the upper protective cover and the filter assemblage was sintered for about 20 minutes at 1,900° F. to sinter bond the individual particles of the metal particle with each other, the filter pack and the end cap. The presence of the protective covers prevented the weight and the filter assemblage from bonding to the fixture.

After sintering, the fixture was removed from the Hydrogen Bell furnace and cooled, and the filter assemblage was removed from the fixture. The trough of a second 316L stainless steel end cap was then filled with the alloy powder and the second end of the filter assemblage was bonded to the end cap by repeating the above-described procedure.

As a result of the process described in this example, a strong, virtually impermeable sinter bond was formed between the filter pack and the end cap. Structurally, the bond defines a particulate mass including a multitude of adjacent individual particles of nickel-chromium alloy. The adjacent particles typically share a common boundary along at least a portion of their surfaces where they are sinter bonded but may also include discrete boundaries that are free from contact along other portions of their surfaces. The resultant bond is sufficiently impervious as to prevent bypass flow around the filter medium.

While several embodiments of the invention have been described in some detail, it should be understood that the invention encompasses various modifications and alternative forms of those embodiments. It should also be understood that the specific embodiments are not intended to limit the invention. For example, the above described embodiments relate to a method of bonding a filter pack to an end cap. However, the invention also encompasses bonding a filter pack directly to a filter housing or any other structure. In addition to the preceding, the invention covers all other modifications, equivalents and alternatives falling within the spirit and scope of the claims.

What is claimed is:

1. A method of making a filter assembly comprising:

contacting a filter pack and an end cap with a bonding mixture comprising a particulate material to form a filter assemblage; and heat treating the filter assemblage to sinter the particulate material and bond the end cap to the filter pack including forming a sinter bond having a pore structure sufficiently fine to prevent bypass around the filter pack.

2. A method of making a filter assembly as claimed in claim 1 wherein said contacting step includes adding particulate material to the end cap, seating the filter pack in the end cap, adding a wetting mixture to the end cap and agitating the filter assemblage.

3. A method of making a filter assembly as claimed in claim 2 wherein agitating the filter assemblage includes vibrating the filter assemblage and impacting the filter assemblage.

4. A method of making a filter assembly as claimed in claim 3 wherein the step of adding a wetting mixture to the end cap includes adding an alcohol to the end cap.

5. A method of making a filter assembly as claimed in claim 4 wherein the alcohol is isopropyl alcohol.

6. A method of making a filter assembly as claimed in claim 4 including the step of drying the filter assemblage prior to said heat treating step.

7. A method of making a filter assembly as claimed in claim 6 wherein said heat treating step includes heat treating the filter assemblage under a weighted load.

8. A method of making a filter assembly as claimed in claim 3 wherein the step of adding a wetting mixture to the end cap includes wetting the particulate material with a liquid having a wetting angle with respect to the particulate material of less than 90°.

9. A method of making a filter assembly as claimed in claim 3 wherein the step of adding a wetting mixture to the end cap includes adding to the end cap a settling liquid selected from the group consisting of acetone, ethyl alcohol and isopropyl alcohol.

10. A method of making a filter assembly as claimed in claim 1 wherein said contacting step includes first seating the filter pack in the end cap and then adding the bonding mixture to the end cap.

11. A method of making a filter assembly as claimed in claim 1 wherein said contacting step includes first adding the bonding mixture to the end cap then seating the filter pack in the end cap.

12. A method of making a filter assembly as claimed in claim 1 wherein the step of contacting a filter pack and an end cap includes contacting a pleated filter pack having pleats greater than 3/8 inch in height.

13. A method of making a filter assembly as claimed in claim 12 wherein the step of contacting a filter pack and an end cap includes contacting a pleated filter pack having pleats greater than 3 inches in height.

14. A method of making a filter assembly as claimed in claim 1 wherein the step of sintering the particulate material and forming a sinter bond includes forming a virtually impermeable sinter bond.

15. A method of making a filter assembly comprising the steps of:

filling an end cap with a particulate material;

wetting the particulate material with a wetting mixture;

seating a filter pack in the end cap;

filling the end cap with the wetting mixture to form a filter assemblage; and sintering individual particles of the particulate material to bond the end cap to the filter pack including forming a sinter bond having a pore structure sufficiently fine to prevent bypass around the filter pack.

16. A method of making a filter assembly as claimed in claim 15 wherein said filter pack is seated in said end cap prior to wetting the particulate material with a wetting mixture.

17. A method of making a filter assembly as claimed in claim 16 wherein said wetting mixture comprises isopropyl alcohol.

18. A method of making a filter assembly as claimed in claim 17 including the step of vibrating the filter assemblage to disperse the particulate material in said end cap.

19. A method of making a filter assembly as claimed in claim 18 including the step of applying an impacting load to the filter assemblage to provide a wet tap density.

20. A method of making a filter assembly as claimed in claim 19 wherein the step of applying an impacting load to the filter assemblage includes impacting the assemblage on a hard surface.

21. A method of making a filter assembly as claimed in claim 19 including the step of drying the filter assemblage after applying an impacting load.

22. A method of making a filter assembly as claimed in claim 21 wherein the step of sintering individual particles of the particulate material includes placing the filter assemblage under a weighted load during sintering.

23. A method of making a filter assembly as claimed in claim 22 wherein the step of filling the end cap with a particulate material comprises filling the end cap with stainless steel.

24. A method of making a filter assembly as claimed in claim 22 wherein the step of filling the end cap with a particulate material comprises filling the end cap with 316L stainless steel.

25. A method of making a filter assembly as claimed in claim 24 wherein the 316L stainless steel particulate material has a particle size of about 10 microns.

26. A method of making a filter assembly as claimed in claim 25 wherein the step of contacting a filter pack and an end cap includes contacting a pleated filter pack having pleats greater than 3/8 inch in height.

27. A method of making a filter assembly as claimed in claim 26 wherein the step of contacting the filter pack and an end cap includes contacting a pleated filter pack having pleats greater than 3 inches in height.

28. A method of making a filter assembly as claimed in claim 27 wherein the step of contacting a filter pack and an end cap includes contacting a filter pack comprising stainless steel.

29. A method of making a filter assembly as claimed in claim 27 wherein the step of contacting a filter pack and an end cap includes contacting an end cap comprising stainless steel.

30. A method of making a filter assembly as claimed in claim 29 wherein the filter pack and the end cap comprise 316L stainless steel.

31. A method of making a filter assembly as claimed in claim 30 wherein the step of contacting a filter pack and an end cap includes contacting a filter pack having at least one of a support layer and a drainage layer.

32. A method of making a filter assembly as claimed in claim 31 wherein the step of contacting a filter pack and an end cap includes contacting a filter pack having at least one of a stainless steel support layer and a stainless steel drainage layer.

33. A method of making a filter assembly as claimed in claim 32 wherein the step of sintering the individual particles and forming a sinter bond includes forming a virtually impermeable sinter bond.

34. A filter assembly comprising:
a filter pack;
an end cap; and
a sinter bond including a particulate mass having a multitude of adjacent individual particles sinter bonded to each other, the end cap and the filter pack, and having a pore structure sufficiently fine to prevent bypass around the filter pack.

35. A filter assembly as claimed in claim 34 wherein each one of the particles includes a surface and where first and second adjacent particles share a common boundary area along a first portion of the respective surfaces of each of the first and second particles and wherein each of the first and second particles include discrete boundary areas along a shared second portion of the respective surfaces of each of the first and second particles.

36. A filter assembly as claimed in claim 34 wherein the particulate mass includes a structure having a low sintering temperature component including a multitude of individually bonded particles and a high sintering temperature component including a multitude of individually bonded particles, each particle of the first named component having a surface.

37. A filter assembly as claimed in claim 36 wherein first and second adjacent particles of the low sintering temperature component of the particulate mass share a common boundary along a first portion of the respective surfaces of the first and second particles therein and wherein the first and second particles therein include a discrete boundary along a second portion of the respective surfaces of the first and second particles therein.

38. A filter assembly as claimed in claim 37 wherein first and second adjacent particles of the high sintering temperature component of the particulate mass are at least in point contact with each other.

39. A filter assembly as claimed in claim 38 wherein at least a portion of the individual particles of the low sintering temperature component of the particulate mass are at least in point contact with adjacent particles of the high sintering temperature component of the particulate mass.

40. A filter assembly as claimed in claim 34 wherein said individual particles of said particulate mass have a particle size of about 10 μm.

41. A filter assembly as claimed in claim 40 wherein said individual particles of said particulate mass comprise stainless steel.

42. A filter assembly as claimed in claim 41 wherein said end cap comprises stainless steel.

43. A filter assembly as claimed in claim 42 wherein said filter pack comprises stainless steel.

44. A filter assembly as claimed in claim 40 wherein said individual particles of said particulate mass comprise 316L stainless steel.

45. A filter assembly as claimed in claim 34 wherein said filter pack, said end cap and said individual particles of said particulate mass comprise 316L stainless steel.

46. A filter assembly as claimed in claim 34 wherein said filter pack is pleated.

47. A filter assembly as claimed in claim 46 wherein the pleats of said filter pack are greater than ⅜ inch in height.

48. A filter assembly as claimed in claim 46, wherein the pleats of said filter pack are greater than 3 inches in height.

49. A filter assembly as claimed in claim 46, wherein the filter pack includes at least one of a support layer and a drainage layer.

50. A filter assembly as claimed in claim 46, wherein said at least one of a support layer and a drainage layer comprises wire mesh.

51. A method of making a filter assembly as claimed in claim 34 wherein the sinter bond is virtually impermeable.

52. A filter assemblage comprising:
an end cap;
a filter pack seated in said end cap; and
a bonding mixture contacting said filter pack and said end cap, said bonding mixture including a particulate material and a wetting mixture, said wetting mixture having a viscosity low enough to prevent suspension of the particulate material.

53. A filter assemblage as claimed in claim 52 where the wetting mixture includes a settling mixture.

54. A filter assemblage as claimed in claim 52 where the wetting mixture includes a settling liquid and a binder.

55. A filter assemblage as claimed in claim 54 wherein the binder includes polyacrylic acid.

56. A filter assemblage as claimed in claim 54 wherein the settling liquid includes an alcohol.

57. A filter assemblage as claimed in claim 52 wherein the wetting mixture includes an alcohol.

58. A filter assemblage as claimed in claim 57 wherein the alcohol is isopropyl alcohol.

59. A filter assemblage as claimed in claim 57 wherein the wetting mixture includes a liquid having a wetting angle with respect to the particulate material of less than 90°.

60. A filter assemblage as claimed in claim 52 wherein individual particles of said particulate material have a particle size of about 10 μm.

61. A filter assemblage as claimed in claim 60 wherein said individual particles comprise stainless steel.

62. A filter assemblage as claimed in claim 61 wherein said end cap comprises stainless steel.

63. A filter assemblage as claimed in claim 62 wherein said filter pack comprises stainless steel.

64. A filter assemblage as claimed in claim 60 wherein said individual particles comprise 316L stainless steel.

65. A filter assemblage as claimed in claim 52 wherein said filter pack, said end cap and said individual particles of said particulate mass comprise 316L stainless steel.

66. A method of making a filter assembly comprising:

contacting a filter pack and a structure with a metal powder to form a filter assemblage; and heat treating the filter assemblage to sinter individual particles of metal powder to the filter pack, the structure and to each other including forming a sinter bond having a pore structure sufficiently fine to prevent bypass around the filter pack.

67. A method of making a filter assembly as claimed in claim 66 wherein the structure includes an end cap.

68. A method of making a filter assembly as claimed in claim 66 wherein the structure includes a filter housing.

69. A method of making a filter assembly as claimed in claim 66 wherein the step of heat treating the filter assemblage and forming a sinter bond includes forming a virtually impermeable sinter bond.

* * * * *